United States Patent
Ogura

(10) Patent No.: US 7,663,514 B2
(45) Date of Patent: Feb. 16, 2010

(54) ENCODING PROCESSING APPARATUS AND DECODING PROCESSING APPARATUS

(75) Inventor: Takayuki Ogura, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 12/178,310

(22) Filed: Jul. 23, 2008

(65) Prior Publication Data

US 2009/0027240 A1 Jan. 29, 2009

(30) Foreign Application Priority Data

Jul. 25, 2007 (JP) .............. P2007-193518

(51) Int. Cl.
*H03M 7/40* (2006.01)
(52) U.S. Cl. ............................. 341/67; 341/106
(58) Field of Classification Search ............. 341/65, 341/67, 106; 375/E7.226, E7.13
See application file for complete search history.

(56) References Cited

U.S. PATENT DOCUMENTS

| 4,999,715 | A * | 3/1991 | Porcellio et al. | 358/426.01 |
| 6,408,029 | B1 * | 6/2002 | McVeigh et al. | 375/240.13 |
| 2009/0086034 | A1 * | 4/2009 | Nakamura et al. | 348/208.4 |
| 2009/0125644 | A1 * | 5/2009 | Yokoyama | 710/11 |

FOREIGN PATENT DOCUMENTS

| JP | 6-152988 | 5/1994 |
| JP | 9-185548 | 7/1997 |

* cited by examiner

*Primary Examiner*—Brian Young
(74) *Attorney, Agent, or Firm*—Finnegan, Henderson, Farabow, Garrett & Dunner, L.L.P.

(57) ABSTRACT

An encoding processing apparatus includes a first storing section for storing first encoded information and second encoded information, a second storing section for storing a table indicating association relation between the first encoded information and the second encoded information, an arithmetic section for calculating the second encoded information by reading the first encoded information stored in the first storing section and searching the table stored in the second storing section, a third storing section for storing by associating the first encoded information previously read from the first storing section and the second encoded information, a first control section for reading the second encoded information associated with the first encoded information from the third storing section, and a second control section for storing by associating the first encoded information with the second encoded information in the third storing section. The arithmetic section performs processing of searching the table stored in the second storing section and calculating the second encoded information.

7 Claims, 7 Drawing Sheets

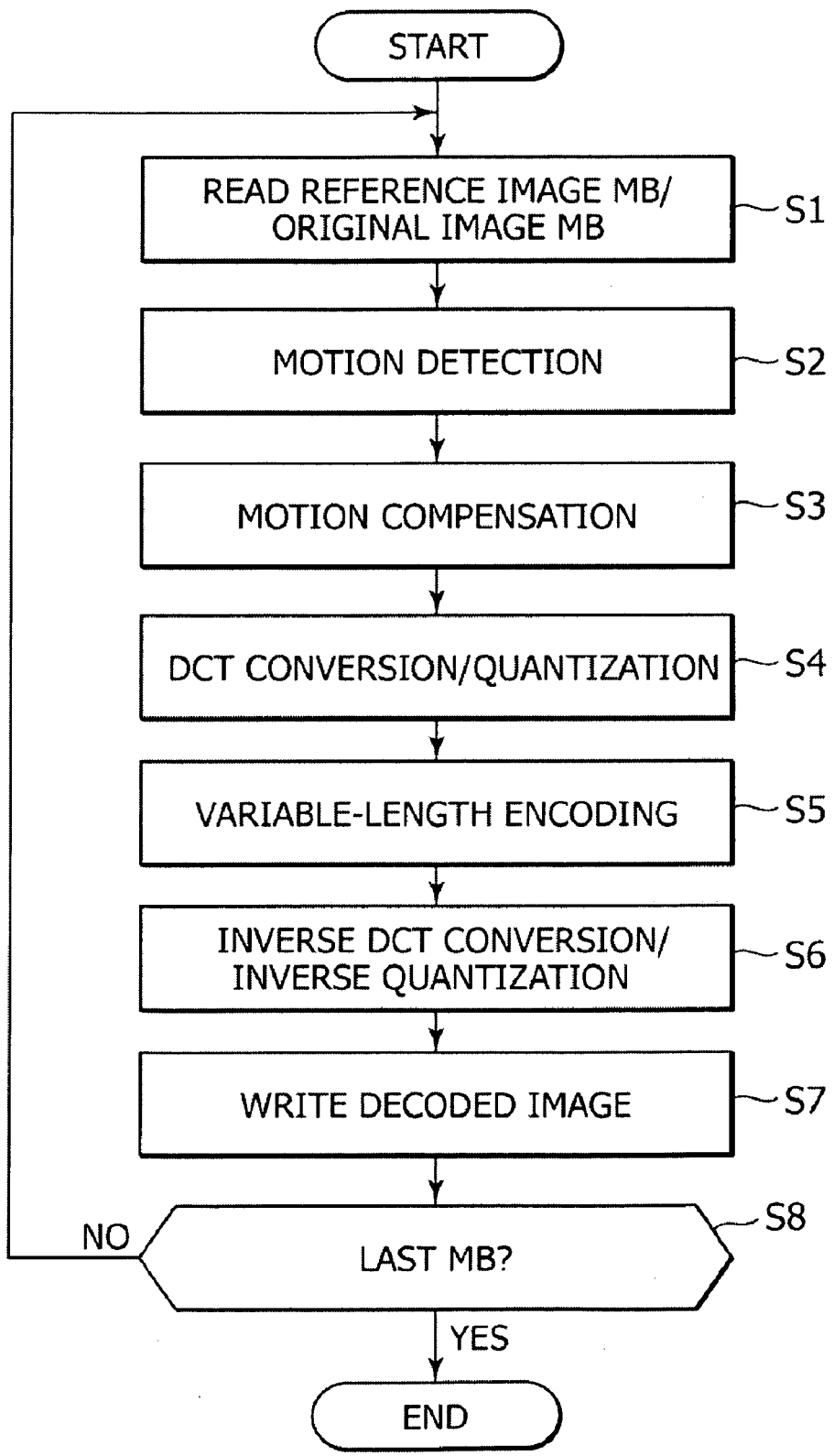

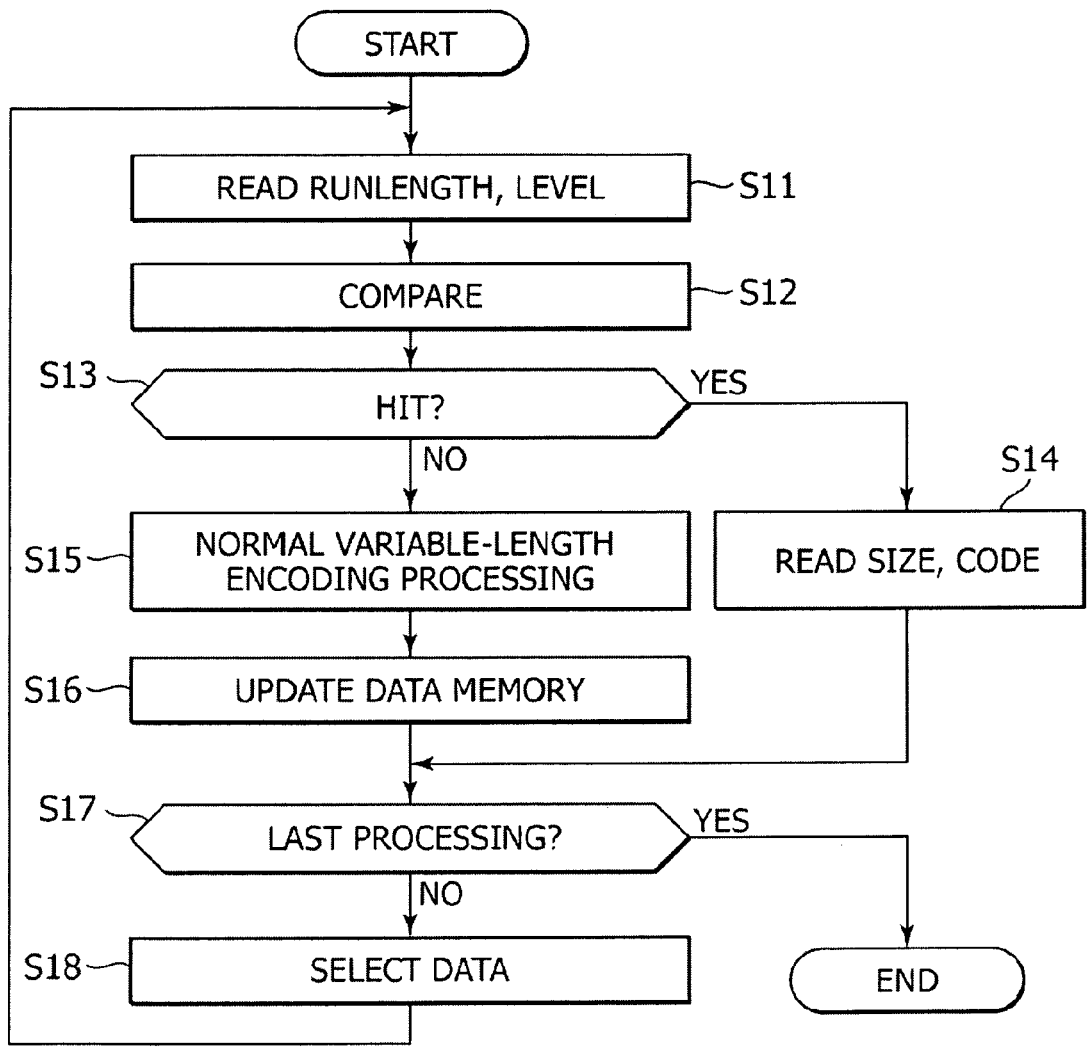

FIG. 6

| CODE | RUNLENGTH | LEVEL | GROUP |
|---|---|---|---|
| . | | | |
| . | | | |
| . | | | |
| 00101 | 0 | 3 | 1 |
| 00111 | 3 | 1 | 1 |
| 00110 | 4 | 1 | 1 |
| 000110 | 1 | 2 | 1 |
| 000111 | 5 | 1 | 1 |
| 000101 | 6 | 1 | 1 |
| 000100 | 7 | 1 | 1 |
| 0000110 | 0 | 4 | 1 |
| 0000100 | 2 | 2 | 2 |
| 0000111 | 8 | 1 | 2 |
| 0000101 | 9 | 1 | 2 |
| . | | | |
| . | | | |
| . | | | |

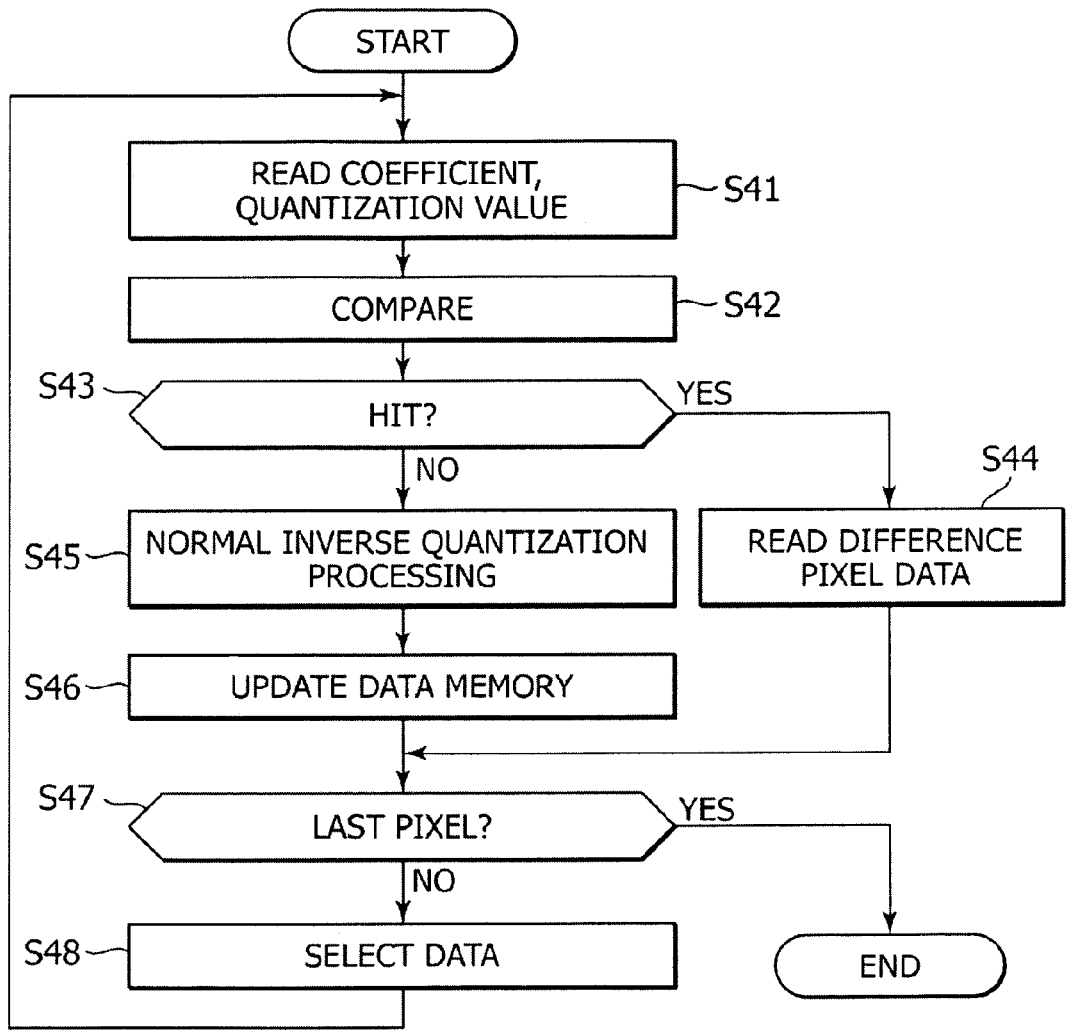

ENCODING PROCESSING APPARATUS AND DECODING PROCESSING APPARATUS

BACKGROUND OF THE INVENTION

1. Field of the Invention

The present invention relates to an encoding processing apparatus encoding image data, and a decoding processing apparatus decoding the encoded image data.

2. Description of Related Art

In variable-length encoding processing in encoding processing of encoding image data compliant with encoding schemes, such as JPEG (Joint Photographic Experts Group) and MPEG (Moving Picture Experts Group), syntaxes are generated from bitstreams by referring to a variable-length code table. For example, in processing of variable-length-encoding DCT (Discrete Cosine Transform) coefficients for the encoded image data, since the processing is the one for performing on macroblock-level syntaxes, the variable-length code table becomes large in size and thus a search processing time becomes also enormous. Particularly, when such search processing is performed by using a general-purpose computation processor, the search processing cannot be performed parallelly, but performed sequentially from the variable-length code table stored in a cache, thereby increasing a processing cycle count.

In order to reduce the time for searching a variable-length code table in decoding processing, Japanese Unexamined Patent Application Publication No. JP H06-152988 (Patent Document 1) discloses a decoding processing apparatus achieving higher-speed search processing by dividing a coded table by the numbers of "1" or "0" consecutively listed from the top of a target bitstream for variable-length decoding processing.

However, in the decoding processing apparatus disclosed in the Patent Document 1, processing steps in which the numbers of "1" or "0" consecutively listed from the top of the target bitstream are obtained first, then a first table is referred by using the obtained value as an address, a second table is referred by using the information obtained by reference, and further a run length is associated with a level for the string of variable-length code bits, has to be performed with respect a Huffman code table provided in advance.

When such processing steps are performed for a general-purpose processor, processing for a run length/level pair requires a processing time of several tens of cycles. In this way, in the processing compliant with the macroblock-based syntaxes, search processing for run-length and level occupies a relatively large percentage. As such, when encoding processing is performed on high-resolution image data, such a general-purpose processor also performs processing other than the variable-length encoding processing, it would become difficult to perform the encoding processing at real time.

Further, in addition to the variable-length encoding processing, the encoding processing includes a step of calculating encoded information by searching a table associating input/output relation of encoded information calculated at an intermediate processing stage. Thus, in the general-purpose processor, in order to perform encoding processing and decoding processing at real time., a reduction of time required for the search processing is required.

SUMMARY OF THE INVENTION

According to embodiments of the present invention, it is desirable to provide an encoding processing apparatus for reducing, in encoding processing of encoding image data, a processing time of search processing of calculating encoded information by searching a predetermined table, and also a decoding processing-apparatus reducing, in processing of decoding the image data encoded by this encoding processing apparatus, a processing time of search processing of calculating decoded information by searching a predetermined table.

In an embodiment of the present invention, there is provided an encoding processing apparatus outputting encoded data obtained by performing redundancy-reducing encoding processing on image data. The encoding processing apparatus includes a first storing section storing first encoded information calculated in the encoding processing performed on the image data, and second encoded information calculated from the first encoded information, a second storing section storing a table indicating corresponding relation between the first encoded information and the second encoded information, an arithmetic section calculating the second encoded information by reading the first encoded information stored in the first storing section and searching the table stored in the second storing section, and storing the calculated second encoded information in the first storing section, a third storing section storing by associating the first encoded information previously read from the first storing section by the arithmetic section with the second encoded information calculated from the first encoded information, a first control section reading, when information same with the first encoded information read from the first storing section by the arithmetic section is stored in the third storing section, the second encoded information associated with the first encoded information from the third storing section, and storing the information in the first storing section, and a second control section storing in the third storing section by associating the first encoded information and the second encoded information when the arithmetic section calculates the second encoded information from the first encoded information read from the first storing section. The arithmetic section performs, only when the second encoded information calculated from the first encoded information read from the first storing section is not stored in the third storing section, processing of searching the table stored in the second storing section and calculating the second encoded information.

In embodiments of the present invention, there is provided a decoding processing apparatus outputting decoded data obtained by performing redundancy-reducing decoding processing on image data. The decoding processing apparatus includes a first storing section storing first decoded information calculated in the decoding processing performed on the encoded data, and second decoded information calculated from the first decoded information, a second storing section storing a table indicating association relation between the first decoded information and the second decoded information, an arithmetic section calculating the second decoded information and storing the calculated second decoded information in the first storing section by reading the first decoded information stored in the first storing section and searching the table stored in the second storing section, a third storing section storing by associating the first decoded information previously read from the first storing section by the arithmetic section and the second decoded information calculated from the first decoded information, a first control section reading, when information same with the first decoded information read from the first storing section by the arithmetic section is stored in the third storing section, the second decoded information associated with the first decoded information from the third storing section, and storing the read second decoded information in the first storing section, and a second control section storing by associating the first decoded information and the second decoded information in the third storing section when the arithmetic section calculates the second encoded information from the first encoded information read from the first storing section by the arithmetic section. The arithmetic section performs, only when the second decoded information calculated from the first decoded information read from the first storing section is not stored in the third storing section, processing of searching the table stored in the second storing section and calculating the second decoded information.

In the encoding processing apparatus of the present invention, only when second encoded information calculated from first encoded information read from the first storing section is not stored in the third storing section, the arithmetic section performs processing of searching a table stored in the second storing section and calculating the second encoded information. Thus, by reducing the frequency of performing the processing of calculating encoded information by directly searching the table, the processing time required for the whole processing of calculating second encoded information from first encoded information can be decreased.

Further, the decoding processing apparatus according to embodiments of the present invention performs, only when second decoded information calculated from first decoded information read from the first storing section is not stored in the third storing section, processings of searching a table stored in the second storing section and calculating the second decoded information. Thus, by reducing the frequency of performing the processing of calculating decoded information by directly searching the table, the processing time required for the whole processing of calculating second decoded information from first decoded information can be decreased.

BRIEF DESCRIPTION OF THE DRAWINGS

FIG. 3 is a flowchart for illustrating steps of encoding processing;

FIG. 4 is a flowchart for illustrating steps of variable-length encoding processing;

FIG. 5 is a diagram showing variable-length code information stored in a data memory section;

FIG. 6 is a diagram showing variable-length code information stored in a data memory section;

FIG. 9 is a flowchart for illustrating steps of inverse quantization processing; and FIG. 10 is a diagram showing input/output information stored in the data memory section during the inverse quantization processing.

DETAILED DESCRIPTION OF THE EMBODIMENTS

Figure 1:
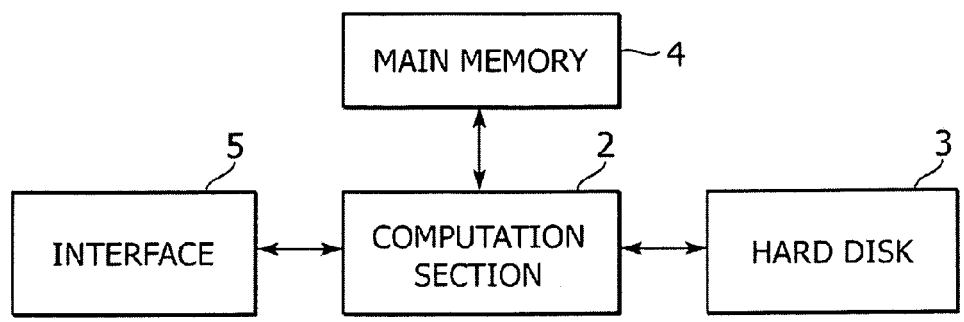
FIG. 1 is a block diagram showing a whole configuration of an image processing apparatus.

An image processing apparatus to which the present invention is applied is an apparatus performing encoding processing of encoding image data, and decoding processing of decoding the encoded image data. In the following, embodiments of the present invention are described with reference to an image processing apparatus 1 shown in FIG. 1 as a specific example of this image processing apparatus.

The image processing apparatus 1 is a computer provided with a general-purpose computation processor, such as one described later, and includes a computation section 2 for performing computation processing, a hard disk 3 storing data such as image data, a main memory 4 for temporarily storing data on which the computation section 2 performs the computation processing, and an interface 5 for input/output of image data and the like from an external.

The computation section 2 reads a program for performing the encoding processing and the decoding processing on the image data, from, for example, the hard disk 3 to the main memory 4, and executes the program.

The hard disk 3 stores image data inputted thereto from the interface 5 and encoded by the computation section 2. The hard disk 3 also stores the program for performing the encoding processing and the decoding processing in advance.

The main memory 4 temporarily stores data on which the computation section 2 performs the computation processing.

The interface 5 captures image data from external, and supplies the captured image data to the hard disk 3 and the main memory 4, in accordance with a control command by the computation section 2.

In the image processing apparatus 1 configured as above, processing is performed in which image data taken by a digital camera or the like is captured from the interface 5, and encoded data is stored on the hard disk 3 or the like. The encoded data is obtained by the encoding processing performed by the computation section 2 on the captured image data in accordance with an encoding scheme, such as JPEG or MPEG. Further, in the image processing apparatus 1, the computation section 2 performs the decoding processing on encoded image data captured from the hard disk 3, the interface 5, and the like, and outputs the decoded image data to an external display device, such as a display.

The encoding processing and the decoding processing performed by the computation section 2 of the image processing apparatus 1 include a step of computing encoded information and decoded information by searching tables associated with input/output relation of information computed at intermediate processing stages such as, variable-length encoding processing and variable-length decoding processing, which are described later. In the image processing apparatus 1 according to the present embodiment, the computation section 2 has the following configuration in order to reduce a time required for the search processing.

Figure 2:
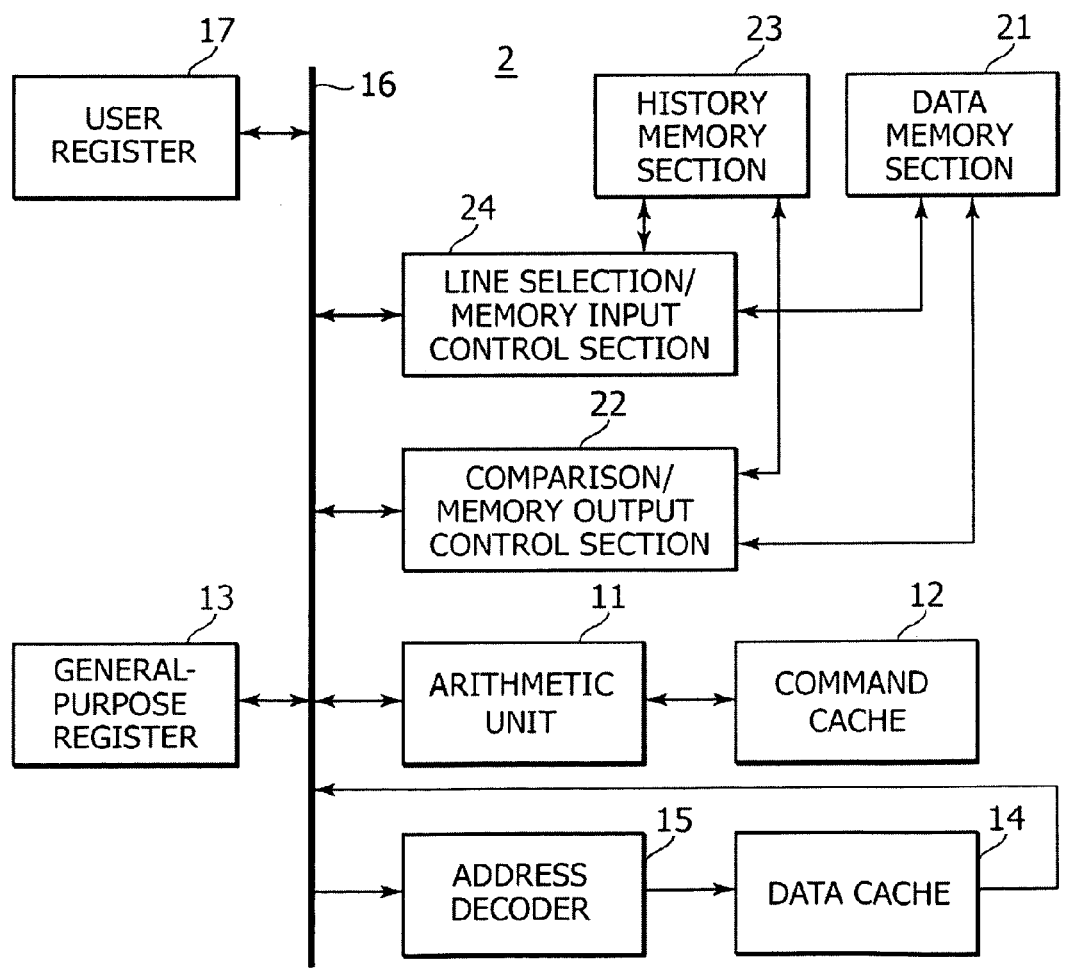
FIG. 2 is a block diagram showing a whole configuration of a computation section.

Namely, the computation section 2 includes, as shown in FIG. 2, an arithmetic unit 11 performing the computation processing for the encoding processing and the decoding processing, an command cache 12 temporarily storing command codes to be executed by the arithmetic unit 11, a general-purpose register 13 temporarily storing data calculated by the arithmetic unit 11, a data cache 14 storing variable-length code tables or the like, which are described later, and an address decoder 15 performing processing of referencing data to be stored in an address of the data cache 14. The components included in the computation section 2 are interconnected via a bus 16.

The arithmetic unit 11 reads data from the general-purpose register 13, performs predetermined computation processing on the read data, and stores the computation processing result in the general-purpose register 13. The arithmetic unit 11 also generates command codes, and temporarily stores the generated command codes in the command cache 12.

The command cache 12 temporarily stores the command codes supplied thereto from the arithmetic unit 1, and also supplies the stored command codes to the arithmetic unit 11.

The general-purpose register 13 stores the data on which the arithmetic unit 11 performs the computation processing, and results of the computation performed by the arithmetic unit 11.

The data cache 14 stores the tables managing input/output information calculated at intermediate processing stages of the encoding processing and the decoding processing, such as the variable-length encoding processing, in accordance with the address number. The data cache 14 also reads address number information referred to by the later-described address decoder 15, and supplies the read information to the arithmetic unit 11.

The address decoder 15 performs decoding processing on an address number indicated by a control command from the arithmetic unit 11, and performs procession of reading data stored in the address of the data cache 14.

While the computation section 2 performs the encoding processing and the decoding processing by executing the program read from the hard disk 3 or the like by the above configuration, in order to reduce the processing time as described above, the computation section 2 is provided with a data memory section 21, a comparison/memory output control section 22, a history memory section 23, and a line selection/memory input control section 24.

The data memory section 21 includes a plurality of line memories, and stores, in each of the line memories, input/output data in which data inputted by the arithmetic unit 11 from the general-purpose register 13 is associated with output data obtained by referring the data cache 14 via the address decoder 15 with respect to the input data.

The comparison/memory output control section 22 performs processing of comparing a group of input data previously computed by the arithmetic unit 11 and stored in the data memory section 21, with input data which is object of computation processing by the arithmetic unit 11, and reading output data stored in the data memory section 21 on the basis of this comparison result.

Further, the comparison/memory output control section 22 parallelly refers information in which a plurality of input data stored in the data memory section 21 is associated with output data. The comparison/memory output control section 22 reads the input data being currently processed by the arithmetic unit 11 from the general-purpose register 13, and makes a comparison to check if there is any line matching with the read input data and the input data stored in a plurality of referred line memories. In other words, the comparison/memory output control section 22 determines whether input/output data hitting the input data being currently processed by the arithmetic unit 11 is stored in the data memory section 21.

The history memory section 23 stores comparison results obtained by the comparison/memory output control section 22 as history information. Specifically, the history memory section 23 stores a hit count indicating the cumulative number of times output data is read as input/output data hitting input data being currently processed by the arithmetic unit 11, and a hit rate obtained by dividing the hit count by the total number of reference times, as a history information per each input/output data stored in the data memory section 21.

The line selection/memory input control section 24 updates the data stored in the data memory section 21, in accordance with computation processing by the arithmetic unit 11.

Furthermore, the computation section 2 includes, in addition to the general-purpose register 13, an user register 17 exclusively managing user-defined information out of information calculated by the arithmetic unit 11.

In the computation section 2 having a configuration such as above, the program stored in the hard disk 3 or the like is read, and the encoding processing and the decoding processing are performed as follows.

Next, an operation of the computation section 2 for the encoding processing will be described.

The computation section 2 generates encoded data from image data according to a flowchart such as shown in, e.g., FIG. 3. In order to start the following encoding processing, it is assumed that the computation section 2 reads image data for encoding to the main memory 4 or the like, and manages the stored image data by dividing into macroblock unit in compliance with syntaxes.

In step S1, the computation section 2 performs processing of reading a macroblock (hereinafter called "current macroblock") of the image data for processing and a macroblock (hereinafter called "reference macroblock") of image data which becomes a reference image of the image data, from, e.g., the main memory 4 to the general-purpose register 13.

In step S2, the computation section 2 performs motion detection on the current macroblock, using the current macroblock and the reference macroblock. Namely, the computation section 2 performs image search on the reference macroblock corresponding to the current macroblock, to determine a reference position of the reference macroblock.

In step S3, the computation section 2 finds a reference position of a resolution accuracy obtained by halving interval between pixels, and generates a difference image on the current macroblock, by the current macroblock and the reference macroblock whose reference position is determined at step S2. Furthermore, while performing the processing of generating the difference image, the computation section 2 generates information on motion vectors.

In step S4, the computation section 2 performs DCT processing and quantization processing on the information about the difference image generated at step S3, to generate quantized DCT coefficients.

In step S5, the computation section 2 performs variable-length encoding processing on the quantized DCT coefficients generated in step S4, together with macroblock-level parameters such as the motion vectors. Then, the computation section 2 stores resultant variable-length-encoded, current macroblock-level encoded data in the general-purpose register 13.

In step S6, the computation section 2 performs inverse quantization processing and inverse DCT conversion processing on the quantized DCT coefficients generated at step S4.

In step S7, the computation section 2 stores current macroblock data decoded at step S6, in the general-purpose register 13, as reference image data for use in processing of encoding a next frame image.

In step S8, the computation section 2 judges whether the macroblocks processed as the current macroblocks in the processings of steps S1 to S6 is the last-positioned macroblock among macroblocks forming the frame image. The computation section 2 ends this processing when judging in the judgment processing that the macroblock is the last-positioned macroblock, but returns to step S1 when judging that the macroblock is not the last-positioned macroblock.

Of the processing steps, the variable-length encoding processing at step S5 will be described next in detail with reference to a flowchart shown in FIG. 4.

For the processing according to the flowchart shown in FIG. 4, it is assumed that the computation section 2 stores information about the DCT coefficients generated in step S4 and about the motion vectors, in the general-purpose register 13 as information compliant with a syntax formed of a run-length and level. It is also assumed that the computation section 2 stores, in the data cache 14, a variable-length encode table to which a code-length formed of a size and code is assigned, according to the occurrence frequency of a syntax formed of a run-length and level. For convenience, the information compliant with a syntax formed of a run-length and level is assumed as first encoded information, and a bitstream formed of a size and code calculated from the first encoded information is assumed as second encoded information.

In the related-art variable-length encoding processing, the arithmetic unit searches the second encoded information associated with the first encoded information by referring to the variable-length code table stored in the data cache. On the other hand, in the variable-length encoding processing according to the present embodiment, the following processing is performed to store variable-length code information associating previously processed first encoded information with second encoded information calculated from the information in the data memory section 21, and reduction of the processing time is aimed by performing the following processing.

In step S11, the computation section 2 reads, from the general-purpose register 13, first encoded information formed of a pair of run length and level, out of first encoded information about the current macroblock, to the arithmetic unit 11 and the comparison/memory output control section 22.

In step S12, in the computation section 2, the comparison/memory output control section 22 refers variable-length code information associating first encoded information obtained as results of previous computation by the arithmetic unit 11 with second encoded information, from the plurality of line memories in the data memory section 21, as shown in, e.g., FIG. 5. Then, in the computation section 2, the comparison/memory output control section 22 compares the first encoded information read in step S11, with the variable-length encode information stored in the respective line memories, simultaneously and parallelly, at the plurality of line memories unit basis.

In step S13, in the computation section 2, the comparison/memory output control section 22 judges whether any variable-length code information hitting the first encoded information read at step S11 is found in the data memory section 21 in the comparison processing in step S12. The computation section 2 advances to step S14 if any variable-length code information hitting the first encoded information is found in the data memory section 21 in this judgment processing, but advances to step S15 if any variable-length code information hitting the first encoded information is not found in the data memory section 21 in this judgment processing.

In step S14, in the computation section 2, the comparison/memory output control section 22 stores second encoded information corresponding to the variable-length code information hitting in the comparison processing at step S13, in the general-purpose register 13, and also updates history information stored in the history memory section 23 as follows. Namely, the history memory section 23 adds 1 to a hit count on the variable-length code information corresponding to the second encoded information stored in the general-purpose register 13 in this processing, out of the history information, and also updates a hit rate. Then, the computation section 2 advances to step S17.

In step S15, in the computation section 2, the arithmetic unit 11 searches the second encoded information associated with the first encoded information read in step S11, by referring to the variable-length encode table stored in the data cache 14 via the address decoder 15, stores the searched second encoded information in the general-purpose register 13, and thereafter the computation section 2 advances to step S16.

In step S16, in the computation section 2, the line selection/memory input control section 24 updates the information stored in the data memory section 21 as follows. In other words, the line selection/memory input control section 24 stores variable-length code information associating the first encoded information with the second encoded information which are obtained in the search processing by the arithmetic unit 11 in step S15, in the data memory section 21. When there is no storage capacity in the data memory section 21, the line selection/memory input control section 24 deletes variable-length code information corresponding to history information having the lowest hit rate from the data memory section 21 in accordance with the history information stored in the history memory section 23, and thereafter stores the variable-length code information obtained in the search processing by the arithmetic unit 11 in step S15 in the data memory section 21. Then, the computation section 2 advances to step S17.

In step S17, the computation section 2 judges whether the currently processed first encoded information is the last first encoded information compliant with the current macroblock-level syntaxes. The computation section 2 ends this processing when judging that the currently processed first encoded information is the last first encoded information, and advances to step S18 when judging that the currently processed first encoded information is not the last first encoded information.

In step S18, the computation section 2 selects first encoded information to be subject to variable-length-encoding processing next, and returns to step S11.

As above, in the computation section 2, only when it is judged in step S13 that second encoded information calculated from the first encoded information which is read from the general-purpose register 13 is not stored in the data memory section 21, the arithmetic unit 11 searches the variable-length encode table stored in the data cache 14, calculates the second encoded information, and stores the calculated information in the general-purpose register 13, in step S15. Thus, the computation section 2 reduces the frequency of performing the processing of calculating second encoded information by directly searching the variable-length encode table in order to reduce the processing time required for the whole processing of calculating second encoded information from first encoded information.

Further, in the computation section 2, since either one of steps S14 or S15 is performed via the judgment processing in step S13, and since the whole processing from steps S11 to S18 is implemented as one cycle, a cycle count performed at lossless encoding processing can be reduced compared to that in the related art.

Particularly, when the encoding processing is performed on a natural image as image data by using the data memory section 21 having eight line memories, the computation section 2 can perform the processing in step S14 via step S13 at a hit rate of about 50%. Namely, in this case, the computation section 2 can reduce the frequency of performing the normal variable-length encoding processing in step S15 to about half, compared to that in the related art.

The computation section 2 can thus reduce the search processing because possibility of data same with the previously processed data being processed in future is relatively high due to redundancy of the image data about the natural image.

Further, in the computation section 2, it may be configured such that variable-length code information stored in the data memory section 21 is managed by classifying first encoded information having high occurrence frequency according to the quantization value for data for processing. The data memory section 21 manages, as shown in, e.g., FIG. 6, by assigning the variable-length code information including first encoded information which is likely to occur when the quantization value exceeds 20, to a group 1, and by assigning variable-length code information including first encoded information which is likely to occur when the quantization value is above 16 and not more than 20, to a group 2. Then, when a condition for a quantization value of the currently processed macroblock coincides with a condition for a quantization value in a group, the history memory section 23, e.g., doubles a hit rate for history information stored in the history memory section 23, whereas when a quantization value of the currently processed macroblock does not coincide with a condition for a quantization value in a group, the hit rate for the history information stored in the history memory section 23 is not changed. As such, the computation section 2 can increase the frequency of step moving from S13 to S14 with arrangement that variable-length code information which is likely to occur according to the quantization value may be left in the data memory section 21 as much as possible, and the processing time for the encoding processing can be reduced by reducing the frequency of performing the search processing by the arithmetic unit 11.

In the computation section 2, in addition to the above described variable-length encoding processing, processing according to a flowchart such as shown in FIG. 4 mentioned above may be applied also to processing, in which information calculated at an intermediate processing stage of the encoding processing is set as first encoded information, information calculated from this first encoded information is set as second encoded information, and the second encoded information is calculated by searching a table associating the first encoded information with the second encoded information.

Next, an operation of the computation section 2 for the decoding processing will be described.

Figure 7:
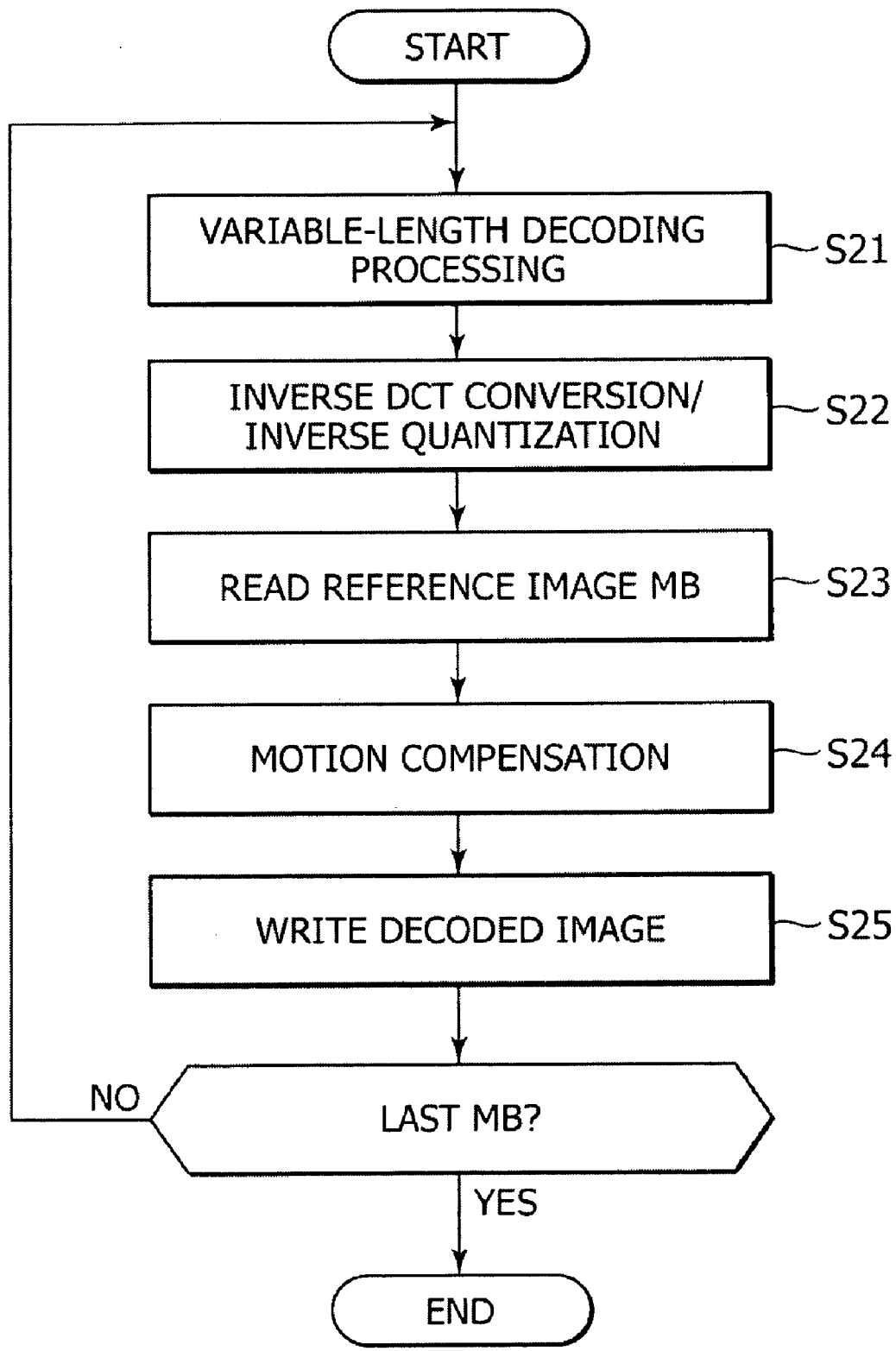
FIG. 7 is a flowchart for illustrating steps of decoding processing.

The computation section 2 decodes encoded image data according to a flowchart such as shown in, e.g., FIG. 7. In order to start the following decoding processing, the computation section 2 reads bitstreams for encoded data to be decoded to the main memory 4 or the like so that the bitstreams may be managed at macroblock unit basis.

In step S21, the computation section 2 performs variable-length decoding processing on a bitstream for the current macroblock for decoding, and generates quantized DCT coefficients and motion vectors.

In step S22, the computation section 2 performs inverse quantization processing and inverse DCT conversion processing on the quantized DCT coefficients generated in step S21 to generate difference image data.

In step S23, the computation section 2 reads a macroblock of image data, which serves as a reference image, from the main memory 4 or the like, in accordance with the motion vectors generated in step S21.

In step S24, the computation section 2 performs motion compensation processing on the difference image data generated in step S22 and the image data which serves as a reference image read in step S23, and generates decoded image for the macroblock.

Instep S25, the computation section 2 stores the decoded image for the macroblock generated in step S23, in the main memory 4 or the like.

In step S25, the computation section 2 judges whether the macroblock processed as the current macroblock in steps S21 through S24 is a last-positioned macroblock out of macroblocks forming the frame image. The computation section 2 ends this processing if judging that the macroblock is the last-positioned macroblock, but returns to step S21 otherwise if judging that the macroblock is not the last-positioned macroblock.

Figure 8:
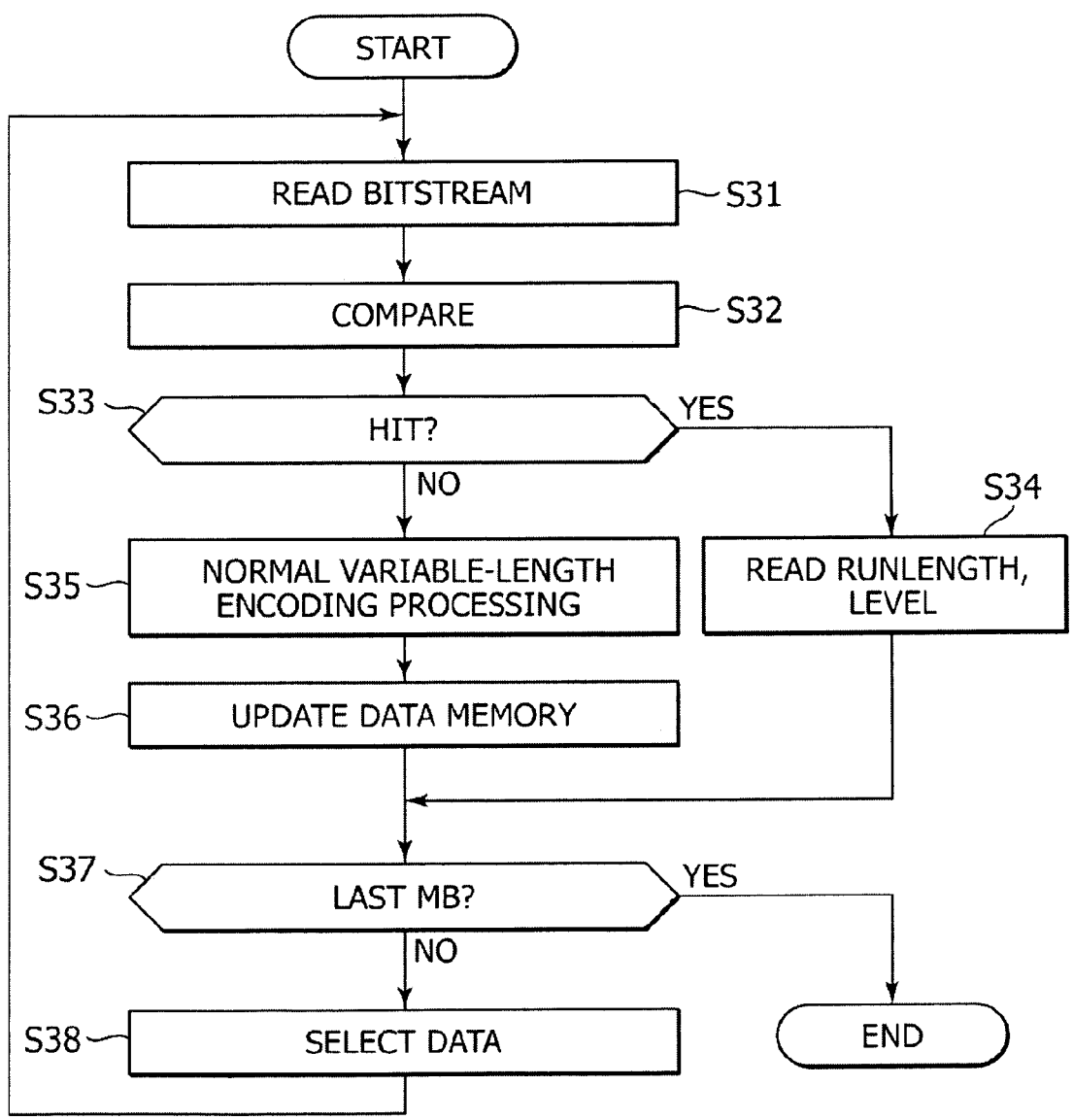
FIG. 8 is a flowchart for illustrating steps of variable-length decoding processing.

Of the above steps, the variable-length decoding processing in step S21 will be described next in detail with reference to a flowchart such as shown in FIG. 8.

For processing according to the flowchart shown in FIG. 8, it is assumed that, in the computation section 2, bitstreams compliant with current macroblock-level syntaxes are stored in the general-purpose register 13. It is further assumed that in the computation section 2, a variable-length decode table for decoding information formed of a size and code forming bitstream into information compliant with a syntax formed of a run length and level, is stored in the data cache 14. Here, for convenience, the above described information formed of a size and code is set as first decoded information, and the information compliant with the syntax formed of a run length and level calculated from this first decoded information is set as second decoded information.

In step S31, in the computation section 2, first decoded information formed of a size/code pair, out of first decoded information for the current macroblock is read from the general-purpose register 13, to the arithmetic unit 11 and the comparison/memory output control section 22.

In step S32, in the computation section 2, the comparison/memory output control section 22 refers variable-length decoded information associating first decoded information with second decoded information which are obtained from previous computation processing by the arithmetic unit 11, from the plurality of line memories in the data memory section 21. Then, in the computation section 2, the comparison/memory output control section 22 compares the first decoded information read in step S31 with the variable-length decoded information stored in the respective line memories, simultaneously and parallelly, at the plurality of line memories unit basis. Specifically, the comparison/memory output control section 22 extracts as many bits as the size from the bitstream read in step S31, and compares the string of extracted bits with the code.

In step S33, in the computation section 2, the comparison/memory output control section 22 judges whether any variable-length decoded information hitting the first decoded information read in step S31 is found in the data memory section 21 in the comparison processing in step S32. The computation section 2 advances to step S34 if any such hit variable-length decoded information is found in the data memory section 21 in this judgment step, but advances to step S35 if any such hit variable-length decoded information is not found in the data memory section 21 in this judgment step.

In step S34, in the computation section 2, the comparison/memory output control section 22 stores second decoded information corresponding to the variable-length decoded information hitting in the comparison processing in step S33, in the general-purpose register 13, and also updates history information stored in the history memory section 23 as follows. Namely, the history memory section 23 adds 1 to a hit count for the variable-length decoded information corresponding to the second decoded information stored in the general-purpose register 13 in this processing, out of the history information, and also updates a hit rate. Then, the computation section 2 advances to step S37.

In step S35, in the computation section 2, the arithmetic unit 11 searches the second decoded information associated with the first decoded information read in step S31 by referring a variable-length decode table stored in the data cache 14 via the address decoder 15, and stores the searched second decoded information in the general-purpose register 13, and thereafter the computation section 2 advances to step S36.

In step S36, in the computation section 2, the line selection/memory input control section 24 updates the information stored in the data memory section 21 as follows. Namely, the line selection/memory input control section 24 stores variable-length decoded information associating the first decoded information with the second decoded information which are obtained in the search processing by the arithmetic unit 11 in step S35, in the data memory section 21. Here, there is no storage capacity in the data memory section 21, the line selection/memory input control section 24 deletes variable-length decoded information corresponding to history information having the lowest hit rate from the data memory section 21 in accordance with the history information stored in the history memory section 23, and thereafter stores the variable-length decoded information obtained in the search processing by the arithmetic unit 11 in step S35, in the data memory section 21. Then, the computation section 2 advances to step S37.

In step S37, the computation section 2 judges whether the currently processed first decoded information is the last first decoded information compliant with the current macroblock-level syntaxes. The computation section 2 ends this processing when judging that the currently processed first decoded information is the last first decoded information in this judgment processing, but advances to step S38 when judging that the currently processed first decoded information is not the last first decoded information in this judgment processing.

In step S38, the computation section 2 selects first decoded information to be subject to variable-length-decoded processing next, and returns to step S31.

In the above way, in the computation section 2, only when it is judged in step S33 that second decoded information calculated from first decoded information read from the general-purpose register 13 is not stored in the data memory section 21, the arithmetic unit 11 searches the variable-length decode table stored in the data cache 14, calculates the second decoded information, and stores the calculated information in the general-purpose register 13, in step S35. As such, the computation section 2 reduces the frequency of performing the processing of calculating second decoded information by directly searching the variable-length decode table, and thus the processing time required for the whole processing of calculating second decoded information from first decoded information can be reduced.

Further, in the computation section 2, since either one of steps S34 or S35 is performed via the judgment processing in step S33, and since the whole processing from steps S31 to S38 is implemented as one cycle, a cycle count required for lossless decoding processing can be reduced compared to that in the related art.

It is noted that in the computation section 2, in addition to the above described variable-length decoding processing, processing according to a flowchart such as shown in FIG. 8 mentioned above may be applied also to processing, in which information calculated at an intermediate processing stage of the decoding processing is set as first decoded information, information calculated from this first decoded information is set as second decoded information, and the second decoded information is calculated by searching a table associating the first decoded information with the second decoded information. In the following, a specific example in which such processing is applied to the inverse quantization processing performed at step S22 out of the above decoding processing will be described in detail with reference to a flowchart such as shown in FIG. 9.

For processing according to the flowchart shown in FIG. 9, it is assumed that the computation section 2 stores quantized coefficients and quantization values in the general-purpose register 13 by pixel unit basis. Furthermore, in the following processing, information pairing a quantized coefficient with a quantization value is set as first decoded information, and inverse-quantized difference pixel data is set as second decoded information.

In step S41, in the computation section 2, first decoded information for a pixel for processing is read from the general-purpose register 13 to the arithmetic unit 11 and the comparison/memory output control section 22.

In step 542, in the computation section 2, the comparison/memory output control section 22 refers inverse quantization information associating first decoded information with second decoded information which are obtained from results of previous computation by the arithmetic unit 11, from the plurality of line memories in the data memory section 21 as shown in, e.g., FIG. 10. Then, in the computation section 2, the comparison/memory output control section 22 compares the first decoded information read in step S41 with the inverse quantization information stored in the respective line memories, simultaneously and parallelly, at the plurality of line memories basis.

In step S43, in the computation section 2, the comparison/memory output control section 22 judges whether any inverse quantization information hitting the first decoded information read in step S41 is found in the data memory section 21 in the comparison processing in step S42. The computation section 2 advances to step S44 if any such hit inverse quantization information is found in the data memory section 21 in this judgment step, but advances to step S45 if any such hit inverse quantization information is not found in the data memory section 21 in this judgment step.

In step S44, in the computation section 2, the comparison/memory output control section 22 stores second decoded information corresponding to the inverse quantization information hitting in the comparison processing in step S43, in the general-purpose register 13, and also updates history information stored in the history memory section 23 as follows. Namely, the history memory section 23 adds 1 to a hit count for the inverse quantization information corresponding to the second decoded information stored in the general-purpose register 13 in this processing, out of the history information, and also updates a hit rate. Then, the computation section 2 advances to step S47.

In step S45, in the computation section 2, the arithmetic unit 11 calculates the second decoded information from the first decoded information read in step 541, by the following formula, and stores the calculated information in the general-purpose register 13, and then advances to step S46.

$$F=(((QF\times2)+\text{Sign}(QF))\times QS)/32$$

QF is the quantized coefficient included in the first decoded information, and QS is the quantization value included in the first decoded information. Further, F is the inverse-quantized difference pixel data.

In step S46, in the computation section 2, the line selection/memory input control section 24 stores inverse quantization information associating the first decoded information with the second decoded information which are obtained from the calculation processing by the arithmetic unit 11 in step S45, in the data memory section 21. When there is no storage capacity in the data memory section 21, the line selection/memory input control section 24 deletes variable-length encoded information corresponding to history information having the lowest hit rate from the data memory section 21 in accordance with the history information stored in the history memory section 23, and stores the inverse quantization information obtained from the calculation processing by the arithmetic unit 11 in step S45, in the data memory section 21. Then, the computation section 2 advances to step S47.

In step S47, the computation section 2 judges whether the currently processed first decoded information is first decoded information about the last-positioned pixel forming the frame image. The computation section 2 ends this processing if judging in this judgment processing that the currently processed first decoded information is the last first decoded information, but advances to step S48 if judging that the currently processed first decoded information is not the last first decoded information.

In step S48, the computation section 2 selects first decoded information to be subject to inverse-quantized processing next, and returns to step S41.

In the above way, in the computation section 21, only when it is judged in step S43 that second decoded information calculated from first decoded information read from the general-purpose register 13 is not stored in the data memory section 21, the arithmetic unit 11 calculates, in step S45, the second decoded information from the first decoded information, and stores the calculated information in the general-purpose register 13. Thus, the computation section 2 reduces the frequency of performing the processing in step S45 of calculating difference pixel data corresponding to a quantized coefficient and a quantization value, and thus can reduce the processing time for the whole inverse quantization processing.

It is noted that the present invention is not limited to the embodiments, but may, of course, be modified in various ways without departure from the gist of the present invention.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-193518 filed in the Japanese Patent Office on Jul. 25, 2007, the entire content of which being incorporated herein by reference.

What is claimed is:

1. An encoding processing apparatus outputting encoded data obtained by performing redundancy-reducing encoding processing on image data, comprising;
   a first storing means for storing first encoded information calculated in the encoding processing performed on the image data, and second encoded information calculated from the first encoded information;
   a second storing means for storing a table indicating association relation between the first encoded information and the second encoded information;
   an arithmetic means for calculating the second encoded information by reading the first encoded information stored in the first storing means and searching the table stored in the second storing means, and storing the calculated second encoded information in the first storing means;
   a third storing means for storing by associating the first encoded information previously read from the first storing means by the arithmetic means and the second encoded information calculated from the first encoded information;
   a first control means for reading the second encoded information associated with the first encoded information from the third storing means and storing the information in the first storing means, when information same with the first encoded information read from the first storing means by the arithmetic means is stored in the third storing means; and
   a second control means for storing by associating the first encoded information with the second encoded information in the third storing means, when the arithmetic means calculates the second encoded information from the first encoded information read from the first storing means, wherein;
   the arithmetic means performs, only when the second encoded information calculated from the first encoded information read from the first storing means is not stored in the third storing means, processing of searching the table stored in the second storing means and calculating the second encoded information.

2. The encoding processing apparatus according to claim 1, wherein;
   the second encoded information is information obtained by performing variable-length encoding processing while assigning a code length according to occurrence frequency of the first encoded information.

3. The encoding processing apparatus according to claim 1, further comprising;
   a history storing means for storing history information about the second encoded information being previously read from the third storing means by the first control means, wherein;
   the second control means updates the information stored in the third storing means in accordance with the history information stored in the history storing means, when the arithmetic means calculates the second encoded information from the first encoded information read from the first storing means.

4. A decoding processing apparatus outputting decoded data obtained by performing redundancy-reducing decoding processing on image data, comprising;
   a first storing means for storing first decoded information calculated in the decoding processing performed on the encoded data, and second decoded information calculated from the first decoded information;
   a second storing means for storing a table indicating association relation between the first decoded information and the second decoded information;
   an arithmetic means for calculating the second decoded information by reading the first decoded information stored in the first storing means and searching the table stored in the second storing means, and storing the calculated second decoded information in the first storing means;
   a third storing means for storing by associating the first decoded information previously read from the first storing means by the arithmetic means and the second decoded information calculated from the first decoded information;
   a first control means for reading the second decoded information associated with the first decoded information from the third storing means and storing the information in the first storing means, when information same with the first decoded information read from the first storing means by the arithmetic means is stored in the third storing means; and a second control means for storing by associating the first encoded information with the second encoded information in the third storing means, when the arithmetic means calculates the second encoded information from the first encoded information read from the first storing means, wherein;

the arithmetic means performs, only when the second decoded information calculated from the first decoded information read from the first storing means is not stored in the third storing means, processing of searching the table stored in the second storing means and calculating the second decoded information.

5. The decoding processing apparatus according to claim 4, wherein;

the second decoded information is information obtained by performing variable-length decoding processing while assigning a codelength according to occurrence frequency of the first decoded information.

6. The decoding processing apparatus according to claim 4, further comprising;

a history storing means for storing history information about the second decoded information being previously read from the third storing means by the first control means, wherein;

the second control means updates the information stored in the third storing means in accordance with the history information stored in the history storing means, when the arithmetic means calculates the second encoded information from the first encoded information read from the first storing means.

7. An encoding processing apparatus outputting encoded data obtained by performing redundancy-reducing encoding processing on image data, comprising;

a first storing section for storing first encoded information calculated in the encoding processing performed on the image data, and second encoded information calculated from the first encoded information;

a second storing section for storing a table indicating association relation between the first encoded information and the second encoded information;

an arithmetic section for calculating the second encoded information by reading the first encoded information stored in the first storing section and searching the table stored in the second storing section, and storing the calculated second encoded information in the first storing section;

a third storing section for storing by associating the first encoded information previously read from the first storing section by the arithmetic section and the second encoded information calculated from the first encoded information;

a first control section for reading the second encoded information associated with the first encoded information from the third storing section and storing the information in the first storing section, when information same with the first encoded information read from the first storing section by the arithmetic section is stored in the third storing section; and a second control section for storing by associating the first encoded information with the second encoded information in the third storing section, when the arithmetic section calculates the second encoded information from the first encoded information read from the first storing section, wherein;

the arithmetic section performs, only when the second encoded information calculated from the first encoded information read from the first storing section is not stored in the third storing section, processing of searching the table stored in the second storing section and calculating the second encoded information.

* * * * *